Figure 1:
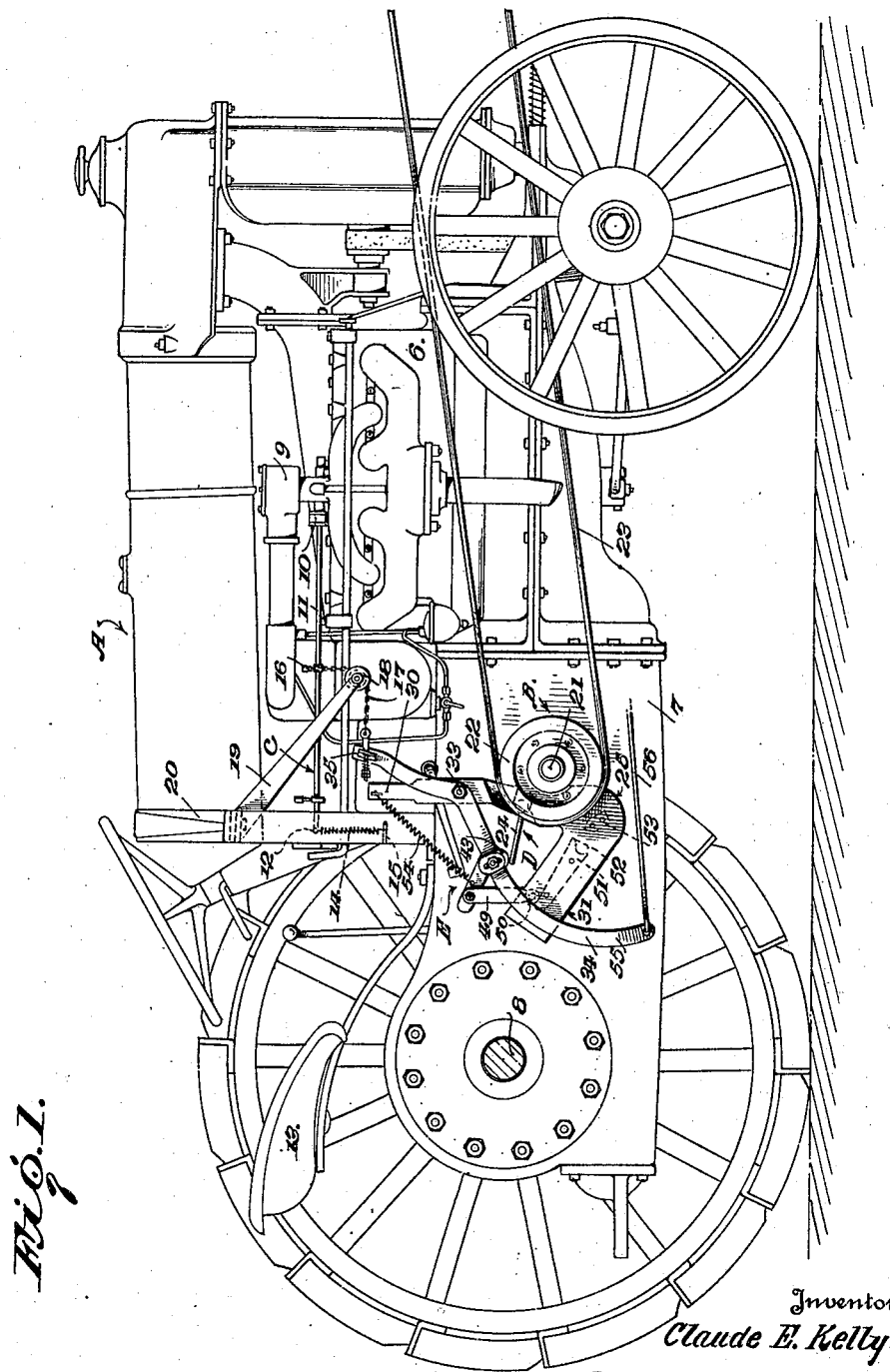

Nov. 5, 1929.  C. E. KELLY  1,734,037
CONTROL MECHANISM FOR POWER PLANTS
Filed Oct. 12, 1928  2 Sheets-Sheet 1

Inventor
Claude E. Kelly.
By
Attorney

Nov. 5, 1929.　　　　C. E. KELLY　　　　1,734,037
CONTROL MECHANISM FOR POWER PLANTS
Filed Oct. 12, 1928　　2 Sheets-Sheet 2
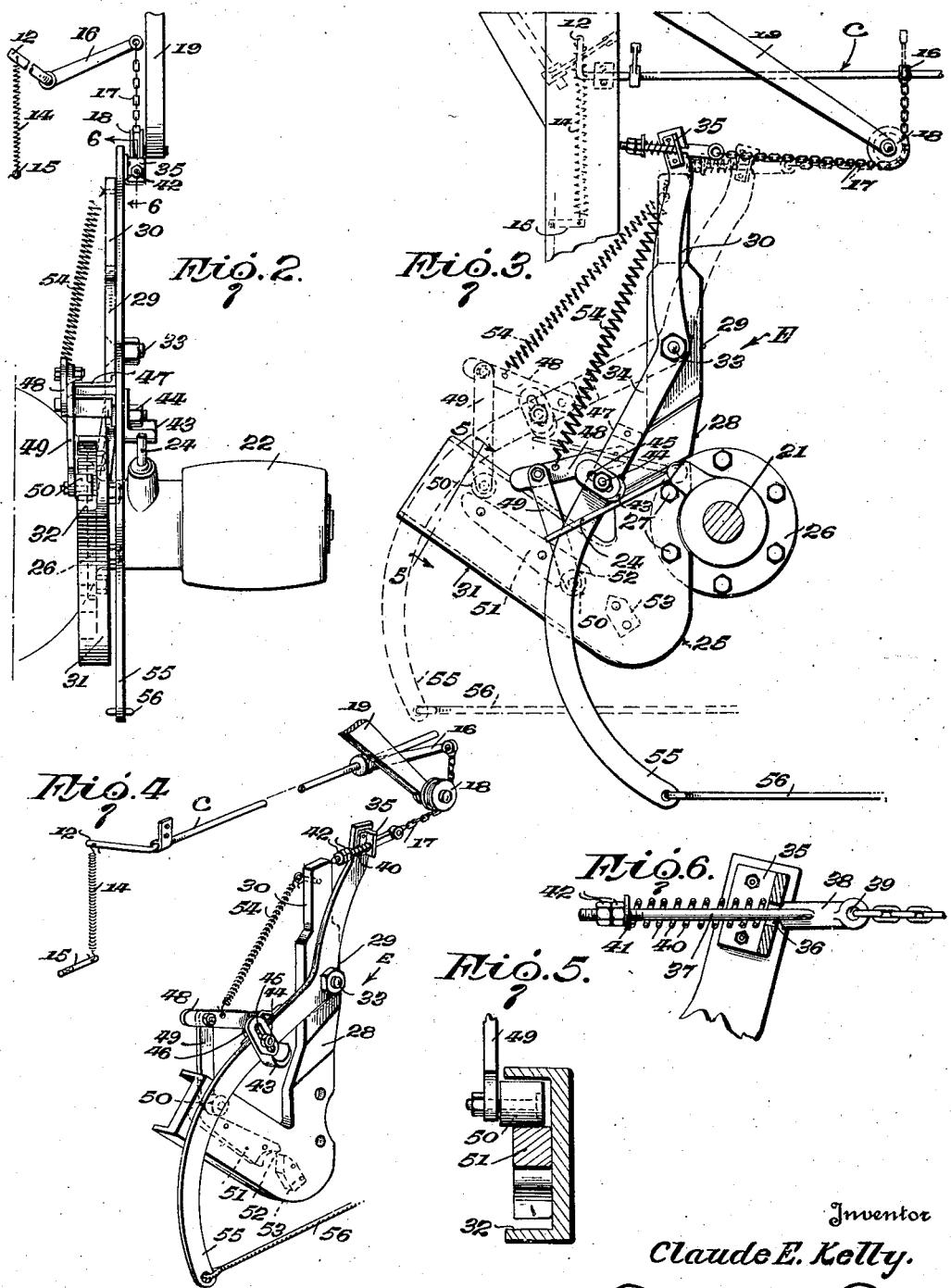
Inventor
Claude E. Kelly.
By
Attorney Patented Nov. 5, 1929

1,734,037

UNITED STATES PATENT OFFICE

CLAUDE E. KELLY, OF PRESTON, IOWA

CONTROL MECHANISM FOR POWER PLANTS

Application filed October 12, 1928. Serial No. 312,065.

This invention relates to control mechanism for power plants and more particularly to mechanism operable to provide a remote control for the auxiliary power take-off and the gas throttle for a tractor, or other motor vehicle.

A primary object of this invention is to provide a control mechanism which may be associated with a tractor, or the like, having a power take-off shaft, the said mechanism functioning to control the connection of the said shaft with the power plant of the tractor and simultaneously control the speed of operation of said power plant.
A further important object of the invention is to provide a control mechanism which is of exceedingly simple construction and yet one which will operate very efficiently to perform its intended work.
Other objects and advantages of the invention will be apparent during the course of the following description:

In the accompanying drawings forming a part of this specification and in which like numerals are employed to designate like parts throughout the same, Figure 1 is a side elevational view of a conventional form of tractor with one wheel removed to better illustrate the control mechanism associated with said tractor, Figure 2 is a detail edge elevational view of the specific control mechanism embodying this invention, Figure 3 is a side elevational view of the said control mechanism, Figure 4 is a perspective view of the control mechanism, and Figures 5 and 6 are detail views of fragmentary portions of the said mechanism.
Briefly described, the invention contemplates the use of a tractor designated in its entirety by the reference character (A). This tractor includes a power take-off (B) by means of which any suitable auxiliary mechanism may be operated. The tractor further includes a gas throttle (C) which functions in the usual manner to control the feeding of fuel to the power plant whereby the speed of operation of the power plant may be governed. The power take-off (B) is selectively connected to the power plant of the tractor by a clutch mechanism (D). Associated with the clutch mechanism (D) and the gas throttle (C) is a control mechanism (E) which enables an operator located upon the apparatus receiving its power from the take-off mechanism to control said clutch and throttle.

In the drawings, wherein for the purpose of illustration is shown a preferred embodiment of this invention, the tractor (A) is illustrated as being of the Fordson type but it is to be understood that I do not intend to limit myself to the use of the control mechanism on this particular make of tractor alone as the mechanism is considered as being suitable for use on any conventional form of tractor. The tractor (A) includes generally a power plant 6 having a transmission housing 7 suitably connected thereto and functioning to inclose the drive mechanism from the power plant to the rear axle 8 of the tractor. This transmission mechanism is not illustrated as it forms no part of the present invention. The engine 6 is provided with a carburetor 9 from which the fuel is supplied to the power plant. A valve mechanism 10 is provided for the carburetor 9 and is controlled by the throttle (C).

This throttle (C) includes a rod 11 which extends longitudinally of the tractor and is provided at its rear end with the usual operating handle 12 located conveniently to the driver's seat 13 of the tractor. A spring 14 is connected to the extremity of the handle 12 and is further connected by means of a pin 15 to a stationary portion of the tractor body. The spring 14 functions normally to retain the valve 10 in its opened position.

A rock arm 16 is rigidly connected to the rod 11 and has attached to its outer end a flexible cable or the like 17 which is trained over a pulley 18 mounted on a bracket 19. This bracket is connected to the gas tank supporting bracket 20 by means of bolts or the like which act as securing means for the different parts of the bracket 20. The flexible cable 17 is connected to the control mechanism in a manner which will be disclosed at a later point.

The auxiliary power take-off (B) includes a shaft 21 projecting laterally from one side of the housing 7. This shaft 21 has keyed thereto a pulley 22 adapted for having trained thereover a belt 23 which may extend to any apparatus suitable for being driven by or receiving power from said take-off mechanism. The shaft 21 is selectively connected to the power plant of the tractor by means of the clutch (D) which includes a clutch operating lever 24. This lever is operatively connected with the control mechanism in a manner to be described at a later point.

The control mechanism (E) includes an angular bracket or mounting member 25 which is secured to the clutch flange 26 of the auxiliary take-off mechanism (B) by means of the bolts 27 normally functioning to mount the flange upon the housing 7. The bracket 25 includes a vertically extending branch 28 having an offset portion 29 which terminates at its upper end in a reduced portion 30. The bracket 25 is provided with a second branch 31 which is of channel formation and has its channeled portion 32 presented to the adjacent side wall of the housing 7.

Pivoted to the portion 29 of the branch 28 by means of the fulcrum 33, is a lever 34. This lever extends vertically and has secured to its upper end an angle bracket 35. This bracket is apertured at 36 for slidably receiving the pin 37. This pin is enlarged at 38 and terminates in the eye portion 39 to which the flexible cable or the like 17 is permanently connected. The remaining portion of the pin 37 is encircled by a spring 40 which bears at one end against the bracket 35 and at its opposite end against a washer 41 adjustably held in place by the lock nuts 42 which are threadedly connected to the end of the pin. This structure is illustrated in detail in Fig. 6 and functions as an adjustable and yieldable connection between the lever 34 and the flexible cable 17.

On the opposite side of the fulcrum 33, the lever is provided with a segmentary cam 43 which is adjustably connected to the said lever by the bolt 44 and the slot 45 formed in the arm 46 of the cam. This cam 43 is operatively associated with the clutch operated lever 24 in the manner best illustrated in Figs. 1 to 3 inclusive.

Projecting from the inner face of the lever 34, at a point adjacent the cam 43, is a U-shaped bracket 47 having connected to its middle portion the arm 48. This arm 48 has pivotally secured adjacent its outer end a link 49 having journaled at its free end a roller 50. The roller is located at one side of the link 49, as best illustrated in Fig. 2, so as to be positioned within the channeled portion 32 of the branch 31. Within the channel of this branch is an elongated cam 51 which is secured to the web portion of the branch by rivets or the like in the manner illustrated. The cam 51 is provided with opposite longitudinal edges and an end notch 52. Located in spaced relation with respect to the end notch 52 is an abutment 53 having a pointed end presented to the said notch.

For the purpose of urging the lever 34 in one direction, a spring 54 is connected at one end to the arm 48 and at its other end to the reduced portion 30 of the branch 28. The extreme lower end 55 of the lever has connected thereto a rod or the like 56 adapted to extend to the apparatus to be operated by or receive its power from the auxiliary take-off (B) by means of the bolt 23. By means of this rod 56, the operator of the remotely actuated apparatus, not shown, controls the cluch (D) and the throttle (C) of the tractor.

The operation of this device may be described as follows:

The spring 14 normally functions to hold the valve 10 in its opened position. The clutch mechanism (D) normally connects the shaft 21 with the power plant 6 of the tractor and the lever 24 must be moved out of the position illustrated in Fig. 1 into the position illustrated in Fig. 3 to disconnect the shaft from the said power plant. The spring 54 normally holds the lever 34 in the position illustrated in Fig. 1 and the position illustrated in dash lines in Fig. 3. In view of these facts, the power plant normally is operating at a predetermined rate of speed and the pulley 22 is operatively connected to the power plant for driving the belt 23. To disconnect the pulley 22 from the power plant and to move the valve 10 toward its closed position, the operator pulls upon the rod 56. Movement of the rod causes the lever 34 to pivot into the full line position illustrated in Fig. 3. This movement of the lever causes its upper end to pull upon the flexible cable 17 which in turn moves the rock arm 16 downwardly for actuating the rod 11 to close the valve 10. During the pivotal movement of the lever 34, the cam 43 engages the clutch lever 24 for actuating the latter to disconnect the pulley 22 and its shaft 21 from the power plant 6. During the downward movement of the lower portion of the lever 34, the link 49 has been moved so that the roller 50 travels longitudinally along the upper edge of the cam 51 and upon reaching the end of this cam, the roller 50 is guided by the abutment 53 into the notch 52. This connection between the cam 51 and the link 49 acts as a catch or latch for retaining the lever 34 in its pivoted or abnormal position. The valve 10 is now moved to cause the power plant 6 to idle and the pulley 22 is disconnected from the said power plant. To re-open the valve 10 and to actuate the clutch (D) so as to connect the pulley 22 to the power plant, the operator pulls upon the rod 56 which moves the lower end of the lever a sufficient distance to permit the roller 50 to drop out of the notch 52. The rod 56 then is released by the operator and the spring 54 will return the lever to its normal position, as shown in Fig. 1. During this return movement of the lever, the roller 50 travels along the lower longitudinal edge of the cam 51 and assumes its normal position, as shown in dash lines in Figs. 1 and 3.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In a device of the type described, the combination with a tractor having an auxiliary power take-off shaft, a clutch for controlling the connection of the shaft with the power plant of the tractor, and a throttle valve control rod, of a bracket mounted upon the tractor and a lever pivoted upon the bracket and movable in opposite directions to simultaneously control the clutch for the power take-off shaft and the throttle valve rod.

2. In a device of the type described, the combination with a tractor having a clutch controlled power take-off shaft and a throttle valve, of an angle bracket mounted on the tractor, a lever mounted on one branch of the bracket, connections between the lever and the clutch and throttle valve for operating said clutch and throttle valve upon movement of the lever, and mechanism associated with the lever and the remaining branch of the bracket for retaining the lever in one of its operative positions.

3. In a device of the type described, the combination with a tractor having a clutch controlled power take-off shaft and a throttle valve, of an angle bracket mounted on the tractor, a lever mounted on one branch of the bracket, connections between the lever and the clutch and throttle valve for operating said clutch and throttle valve upon movement of the lever, mechanism associated with the lever and the remaining branch of the bracket for retaining the lever in one of its operative positions, and means interposed between said mechanism and the first mentioned branch of said bracket for moving the lever into its other operative position.

4. In a device of the type described, the combination with a tractor having a clutch controlled power take-off shaft and a throttle valve, of an angle bracket mounted on the tractor, a lever mounted on one branch of the bracket, connections between the lever and the clutch and throttle valve for operating said clutch and throttle valve upon movement of the lever, and mechanism associated with the lever and the remaining branch of the bracket for retaining the lever in one of its operative positions, said mechanism including an abutment on the bracket and a pivoted member carried by the lever and adapted to engage said abutment.

5. In a device of the type described, the combination with a motor vehicle having a clutch control lever and a throttle, of a lever pivotally mounted upon the vehicle, a flexible connection between the lever and the throttle, a cam connection between the lever and the clutch control lever, resilient means for moving the lever into one of its operative positions and manually controlled means for moving the lever into its other operative position.

6. In a device of the type described, the combination with a motor vehicle having a clutch control lever and a throttle, of a member pivotally mounted upon the motor vehicle, a flexible connection between said member and the throttle, and an adjustable cam connection between said member and the clutch control lever.

7. In a device of the type described, the combination with a motor vehicle having a clutch control lever and a throttle, of a member pivotally mounted upon the motor vehicle, a flexible connection between said member and the throttle, an adjustable cam connection between said member and the clutch control lever, means for manually moving said member in one direction, and means for automatically moving the member in the opposite direction.

8. In a device of the type described, the combination with a motor vehicle having a clutch control lever and a throttle, of a member pivotally mounted upon the motor vehicle, a flexible connection between said member and the throttle, an adjustable cam connection between said member and the clutch control lever, means for manually moving said lever in one direction, means for automatically retaining the member in its adjusted position, and means for automatically returning said member to its initial position after the retaining means is rendered inoperative.

9. In a device of the type described, the combination with a tractor having a clutch controlled power take-off shaft and a throttle, of a bracket mounted upon the tractor, a lever mounted upon the bracket, a flexible connection between the lever and the throttle, a cam connection between the lever and the clutch for said power take-off shaft, independent means for moving said lever in opposite directions, and automatic means for selectively holding the lever in one of its adjusted positions.

In testimony whereof I have hereunto affixed my signature.

CLAUDE E. KELLY.